3,321,358
PLYWOOD BONDED WITH A RESINOUS COMPOSITION COMPRISING A KETONE-ALDEHYDE RESIN AND A CHEMICALLY BASIC CLAY
Craig C. Campbell, John W. Schick, and John H. Stockinger, all of Cherry Hill, N.J., assignors to Mobil Oil Corp., a corporation of New York
No Drawing. Filed Dec. 20, 1965, Ser. No. 515,147
5 Claims. (Cl. 161—261)

This application is a continuation-in-part of copending application Ser. No. 316,527, filed Oct. 16, 1963, now abandoned.

This invention relates to plywood and its manufacture. It is more particularly concerned with plywood that is bonded with a novel binder composition.

As is well known to those familiar with the art, plywoods are manufactured by joining layers or plies of wood veneer or of wood veneer and a lumber core, with a suitable binder. The most commonly used binders are thermosetting phenol-formaldehyde and urea-formaldehyde resins. The urea-formaldehyde resins are less expensive, but are restricted to use in interior grade plywood, because they lack water resistance. The more expensive phenol-formaldehyde resins are used for exterior grade and marine plywoods. Such plywoods are resistant to water, even to boiling water, i.e. they are considered "boilproof." The desideratun is a single grade of plywood for both exterior and interior use. This has been economically infeasible, because of the relatively high cost of the phenolic resins.

In order to reduce the cost of binder material, resort has been had to the use of fillers. The filler used with phenolic resin binders is a woody (lignocellulosic) material that is very finely divided. Typical fillers are walnut shell flour, selected barks, and oat hull residue from the preparation of furfural. In order to retain bond strength, however, the use of filler has been limited to about 15–20 percent of the total composition as a maximum. Insofar as is now known, mineral fillers have not been successfully used.

In copending application Ser. No. 310,920, filed Sept. 23, 1963, there has been disclosed a novel class of thermosettable water-soluble ketone-aldehyde resins. In copending application Ser. No. 354,435, filed Mar. 24, 1964, there has been disclosed a novel class of thermosettable water-soluble ketone-phenol-aldehyde resin binders. In copending application Ser. No. 369,008, filed May 20, 1964, there has been disclosed a similar class of resin binders wherein part of the phenol has been replaced with resorcinol. These resins are good binders for the manufacture of construction boards and they are relatively inexpensive, compared to phenolic resins.

It has now been found that the ketone-aldehyde, ketone-phenol-aldehyde, and ketone-phenol-resorcinol-aldehyde binders can be made even less expensive without loss of bonding strength. It has been discovered that these water-soluble binders can be combined with a chemically basic clay filler. Quite unexpectedly, when this combination of resin and basic clay is used as the binder in plywood manufacture the bond strength is improved and the plywood so produced is boilproof.

Accordingly, it is a broad object of this invention to provide improved plywood and binders therefor. Another object is to provide boilproof plywoods. A specific object is to provide a binder composition of water-soluble ketone-aldehyde, ketone-phenol-aldehyde, or ketone-phenol-resorcinol-aldehyde resin and basic clay filler. Other objects and advantages of this invention will become apparent to those skilled in the art, from the following detailed description.

In general, the present invention provides a binder composition for plywood, which plywood is boilproof and has a high bond strength and a percentage of wood failure superior to that of exterior grade plywood standard in plywood manufacture, that comprises a thermosettable water-soluble ketone-aldehyde, ketone-phenol-aldehyde, or ketone-phenol-resorcinol-aldehyde resin and chemically basic clay filler.

One of the resins utilizable in the binder composition of this invention is water-soluble ammonia catalyzed ketone-aldehyde resin described in copending application Ser. No. 310,920. In general, these resins are made by condensing a ketone reactant and an aldehyde reactant (1–2 moles aldehyde reactant per mole ketone reactant) in the presence of ammonium hydroxide catalyst, at a temperature of between about 200° F. and about 350° F., and for a period of time of between about 30 minutes and about 3 hours.

The ketone-phenol-aldehyde resins described in copending application Ser. No. 354,435 are produced by condensing an aldehyde reactant, a phenol reactant, and a ketone reactant in presence of a base catalyst. The reactants are reacted in molar proportions of between about 2 and 8 moles aldehyde reactant per mole of phenol reactant and between about 0.5 and about 2 moles of ketone reactant per mole of phenol reactant.

The resorcinol modified resins described in Ser. No. 369,008 are prepared in a manner similar to the ketone-phenol-aldehyde resins (Ser. No. 354,435). In the modified resin, however, part of the phenol reactant is replaced by resorcinol. Other dihydric phenols are not satisfactory in such resins.

The ketone reactant used to prepare these resins are ketones having at least two hydrogen atoms on carbon atoms alpha to the carbonyl group. These ketones are the aliphatic, particularly lower alkyl, and the cycloaliphatic ketones. Non-limiting examples of the ketone reactant are acetone, methyl ethyl ketone, methyl isobutyl, diethyl ketone, dihexyl ketone, cyclohexanone, acetonyl acetone, or diacetone. The preferred ketone reactant is acetone. If desired, the ketone reactant can include two or more ketones.

The aldehyde reactant used to make the resins can be formaldehyde or, in general, any compound having an active

group characteristic of aldehydes. Contemplated are the aliphatic aldehydes and aromatic aldehydes, including heterocyclic aldehydes. Non-limiting examples of the aldehyde reactant are formaldehyde (including polymer forms, e.g., paraformaldehyde), acetaldehyde, propionaldehyde, butyraldehyde, acrolein, crotonaldehyde, tiglaldehyde, benzaldehyde, salicyclaldehyde cinnamaldehyde, glyoxal, or furfuraldehyde. Formaldehyde, being inexpensive and readily available, is preferred. Two or more aldehyde reactants can be used.

The phenol reactant used in preparing these resins can be any phenolic compound having hydrogen atoms in at least two and preferably at least three active nuclear positions, including unsubstituted phenol and substituted phenols, such as alkyphenols (in which the alkyl groups are preferably lower alkyl) e.g., cresols, xylenols, ethylphenol, propylphenol, butylphenol, amylphenol, phenylphenol, cyclohexylphenol, and mixtures thereof. Of the foregoing, meta-substituted phenols, various para-substituted phenols (e.g., p-amino phenol), and phenols which are relatively unencumbered against ring reactions are preferred phenol reactants.

The clay component of the binder composition of this invention is a basic clay in a finely-ground state. Typical clays that are utilizable are attapulgus, fullers earth, and bentonites. Particularly preferred are the group of bentonitic clays known as montmorillonites, including montmorillonite, beidellite, nontronite, and hectorite. The amount of clay component in the binder composition can be between about 10 percent and about 75 percent by weight of the total composition, based on the weight of net resin solids exclusive of water. The balance will be ketone-aldehyde binder and a basic catalyst. Total solids content (including the clay) of the plywood resin binder may vary from 40 percent to 70 percent.

The water-soluble thermosettable resin bnder must be thermoset to an insoluble, infusible polymer in presence of a basic catalyst. The composition of clay, a water solution of binder and the basic catalyst are applied to wood plies and plywoods are formed therefrom by molding under heat and pressure to effect a cure to the thermoset polymer. In order to effect bonds of high strength, the viscosity of the aqueous solution of the water-soluble binder used in the compositions of this invention should be between about 5 seconds and about 9 seconds measured by Gardner-Holt method (ASTM designation D–1545–60) at ambient temperature (about 77° F.). Resins having viscosities below 5 seconds can be used in accordance with this invention to obtain acceptable bond strength. In both cases, the water resistance is good.

In cases wherein the product from the reactor has proper viscosity, it can be used directly to make bonded products. In such a case, the catalyst used will already be present and ordinarily no more will be needed. The basic catalysts used in the final curing step can be ammonia, alkali, and alkaline earth metal hydroxides (e.g., NaOH, KOH, Ca(OH)$_2$), dialkylamines, (e.g., dimethylamine, diethylamine), polyethylene amines (e.g., diethylenetriamine, triethylenediamine), polyamides, or alkyleneimines (e.g., pyrroline, pyrrolidine, piperidone, piperazine). The amount of basic catalyst used to effect cure is between about 0.5 percent and about 12 percent, by weight of the resin. Generally, between about 2 percent, by weight and about 8 percent is satisfactory.

Plywoods are made by coating the surfaces of thin sheets of wood with the binder composition. The coated wood sheets are then laminated one on top of another to the desired thickness, with the direction of the grain of adjacent sheets oriented at right angles. The stack of sheets of plys is then heated under pressure.

The amount of binder composition that is applied to the cellulosic material to make the plywood board will be sufficient that the finished board will contain, by weight, between about 4 percent and about 30 percent of binder composition.

In general, pressures of from about 50 p.s.i.g. up to about 800 p.s.i.g. are employed. Curing will be carried out at temperatures between about 300° F. and about 400° F. The curing temperature should not exceed temperatures in the order of about 450° F., at which charring of the cellulosic material may occur. The curing time will be dependent upon the temperature and the flow characteristics of the binder. Sufficient time must be allowed to permit even flow and sufficient thermosetting to provide a board of reasonable uniformity. The period of time can vary between about 5 minutes and about 1 hour. In general practice, the curing time will be between about 12 minutes and about 15 minutes.

The following example illustrates the preparation of a typical resin binder from acetone and formaldehyde.

*Example 1*

Eleven hundred and sixty grams of acetone, 810 g. formaldehyde solution (37% $CH_2O$) and 310 g. paraformaldehyde (95% $CH_2O$) were charged to a stirred autoclave. The mixture was heated to 140° F. and 50 ml. of aqueous ammonium hydroxide (28% $NH_3$) was added carefully through a pressurized buret. The temperature was raised to 255–260° F. and held for 2 hours. The highest recorded pressure was 100 p.s.i. The autoclave was cooled to room temperature and the contents were distilled to recover 50% unreacted acetone. The resultant solution contained 50% resin solids. Any desired solids level can be obtained either by addition or by removal of water under reduced pressure.

*Examples 2 through 6*

A series of plywoods was prepared, using the acetone-formaldehyde binder described in Example 1. In one case, the binder, containing 8 weight percent diethylenetriamine catalyst, was used. In the other cases, the binder and catalyst were admixed with varying amounts of basic montmorillonite clay to form binder compositions of this invention. Pertinent data on these compositions are set forth in the table.

Plywood specimens were prepared by spreading the binder or binder composition on Douglar fir wood veneers at a spread rate of 40 lbs./1000 sq. ft. per single glue line based upon net solids of adhesive mixture. The veneers were then stacked to a thickness of three plies, with the grain of the middle veneer oriented 90° to the direction of grain of the top and bottom layers. Each plywood board was cured at 400° F. for 15 minutes at 125 p.s.i. Then, each board was cut into 1" x 3" test specimens.

Testing was done in accordance with the "Plywood Glue Shear Test" defined in ASTM Designation D805–52. Three types of test were made. Specimens were tested dry. Others were soaked in water for 48 hours at ambient temperature and tested wet. Still other specimens were boiled in water for 4 hours and tested wet. All specimens were examined after test to determine what percentage of the test area showed wood failure (as defined by ASTM). The test results are reported in the table.

*Example 7*

For purposes of direct comparison, a plywood was prepared, as described in Examples 2–6, except that the binder was a typical commercial phenol-formaldehyde resin. Specimens were tested on the dry basis in the plywood glue shear test. The test results are reported in the table.

*Example 8*

For purposes of over all comparison, test specimens were prepared from a commercial, exterior grade plywood and subjected to the plywood glue shear test. The results are set forth in the table.

TABLE

|  | Example | | | | | | |
|---|---|---|---|---|---|---|---|
|  | 2 | 3 | 4 | 5 | 6 | 7 | 8 |
| Binder Composition: | | | | | | | |
| Resin, Wt. percent | 92 | 78.2 | 69 | 55.2 | 30.4 |  |  |
| Catalyst, Wt. percent | 8 | 6.8 | 6 | 4.8 | 2.6 |  |  |
| Clay, Wt. percent | 0 | 15 | 25 | 40 | 67 |  |  |
| Stress at Failure, p.s.i.: | | | | | | | |
| Dry | 166 | 185 | 196 | 179 | 179 | 163 | 219 |
| Soak | 132 | 157 | 123 | 130 | 112 |  | 205 |
| Boil | 85 | 123 | 124 | 132 | 109 |  | 157 |
| Wood Failure, percent: | | | | | | | |
| Dry | 64 | 84 | 72 | 76 | 99 | 28 | 68 |
| Soak | 60 | 48 | 0 | 52 | 81 |  | 46 |
| Boil | 52 | 25 | 15 | 43 | 78 |  | 40 |

From the data in the table, it will be noted that binder compositions containing basic clay filler, in accordance with this invention, form strong bonds. These bonds are even stronger than those using the resin without filler. In comparison to plywood made from the same wood stock with phenol-formaldehyde resin (Example 7), the bonds using binder compositions of this invention are stronger. The commercial plywood (Example 8) had somewhat stronger bond strength.

It is well known, however, that the plywood industry lays little stress on bond strength, as such, and has made no specification with regard to it. The plywood industry gauges bond quality by the degree of wood failure, rather than the stress required to pull it apart. The higher the percentage of bond failure, the higher the quality of the the bond. Measured by this industrial criterion, it will be apparent that with few exceptions the binder compositions of this invention produce superior bonds. It is particularly notable that composites with high filler content (Example 6) form plywood that is outstandingly superior to standard exterior grade plywood.

*Example 9*

For comparison purposes, a binder composition was prepared containing, by solids weight, 95% of the resin of Example 1, 1% diethylenetriamine catalyst, and 4% acidic montmorillonite clay having a pH of about 4. When this composition was used to prepare plywood as aforedescribed, the plywood delaminated upon cooling after removal from the press. This shows that acidic clays are not utilizable as fillers, even in small amounts.

*Example 10*

A binder composition was prepared containing, by solids weight, 73% of acetone-phenol-formaldehyde prepared as described in Example II of Ser. No. 354,435, 1.8% NaOH (as 50% aqueous solution), and 24.5% basic montmorillonite clay. This composition was used to prepare plywoods, as aforedescribed, suing a spread rate of 30 lbs./1000 sq. ft. per single glue line based upon net solids. One plywood, cured at 300° F. for 6 minutes, had a bond strength of 236 p.s.i. and had about 84% wood failure. Another plywood, cured at 325° F. for 6 minutes, had a bond strength of 237 p.s.i. and about 80% wood failure.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:

1. Exterior grade plywood bonded with a binder composition that consists essentially of an aqueous solution of a water-soluble thermosettable resin selected from the group consisting of saturated alkyl ketone-aldehyde resins, and saturated alkyl ketone-phenol-aldehyde resins, and between about 25 percent and about 75 percent, by weight of the binder composition, of a chemically basic clay filler.

2. Exterior grade plywood defined in claim 1, wherein said thermosettable resin is an acetone-formaldehyde resin.

3. Exterior grade plywood defined in claim 1, wherein said thermosettable resin is an acetone-formaldehyde resin and said basic clay is a basic montmorillonite clay.

4. Exterior grade plywood defined in claim 1, wherein said thermosettable resin is an acetone-phenol-formaldehyde resin.

5. Exterior grade plywood defined in claim 1, wherein said thermosettable resin is an acetone-phenol-formaldehyde resin and said basic clay is a basic montmorillonite clay.

References Cited by the Examiner

UNITED STATES PATENTS

| | | | |
|---|---|---|---|
| 2,389,331 | 4/1946 | Rust et al. | 260—50 |
| 2,683,133 | 6/1954 | Harvey et al. | 260—64 |
| 3,006,883 | 10/1961 | Cambron | 260—50 |
| 3,014,530 | 12/1961 | Harvey et al. | 260—29.2 |

MURRAY TILLMAN, *Primary Examiner.*

J. C. BLENTGE, *Assistant Examiner.*